UNITED STATES PATENT OFFICE.

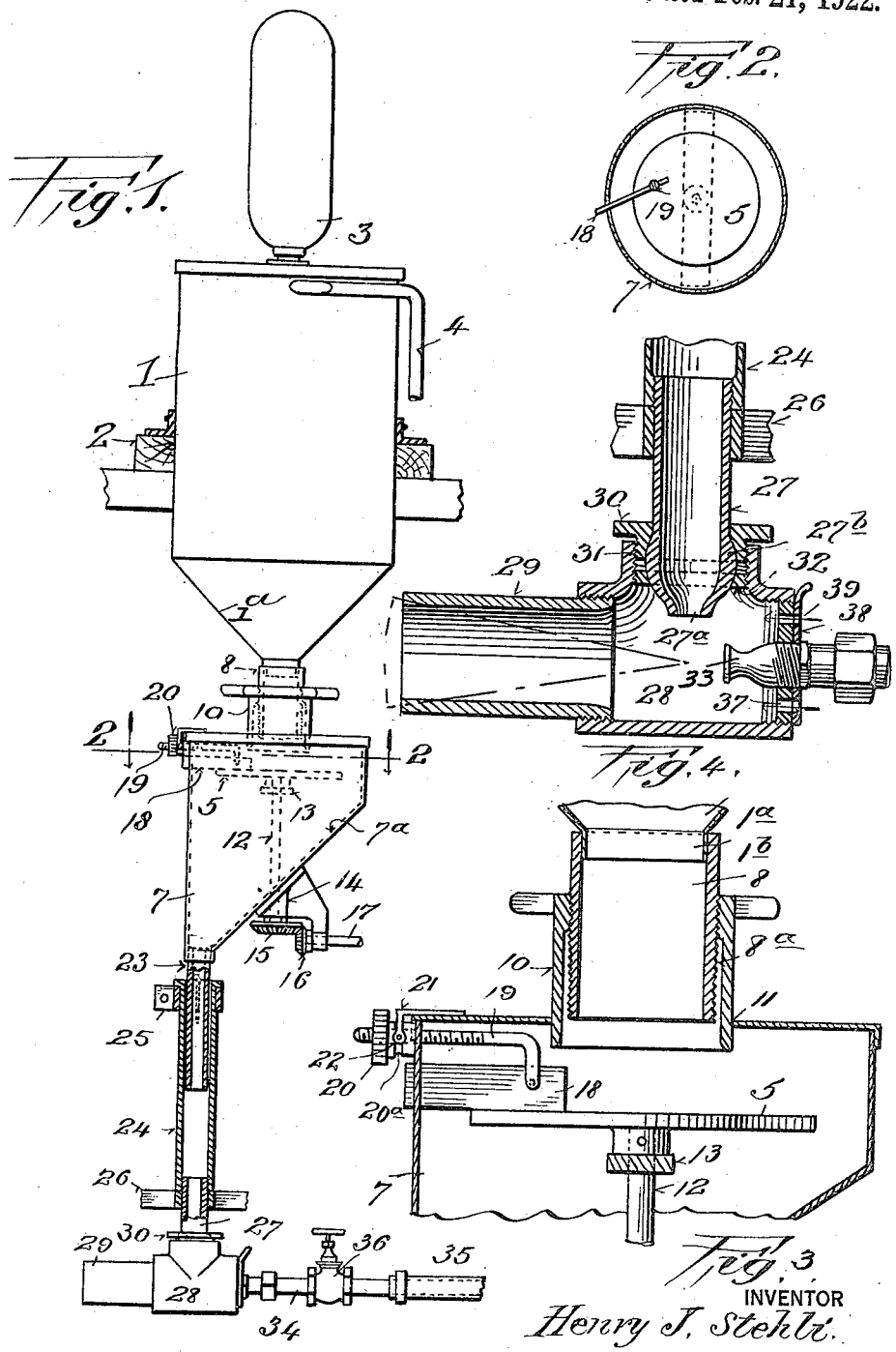

HENRY J. STEHLI, OF CEDAR GROVE, NEW JERSEY, ASSIGNOR TO SINTERING MACHINERY CORPORATION, OF NETCONG, NEW JERSEY, A CORPORATION OF NEW JERSEY.

POWDERED-COAL BURNER.

1,407,600.  Specification of Letters Patent.  Patented Feb. 21, 1922.

Application filed November 26, 1920. Serial No. 426,486.

*To all whom it may concern:*

Be it known that I, HENRY J. STEHLI, a citizen of the United States, and resident of Cedar Grove, in the county of Essex and State of New Jersey, have invented certain new and useful Improvements in Powdered-Coal Burners, of which the following is a specification.

The object of my invention is to provide simple and effective means for commingling powdered coal and air in suitable proportions to produce a combustible mixture and for blowing such mixture under pressure to a place of combustion.

My invention is particularly useful for supplying a mixture of powdered coal and air to a sintering machine for reducing finely divided ores to sinter cakes, although my invention may be used for other purposes.

My invention comprises novel details of improvement that will be more fully hereinafter set forth, and then pointed out in the claims.

Reference is to be had to the accompanying drawings, forming part hereof, wherein—

Figure 1 is a partly sectional side elevation of an apparatus embodying my invention; Fig. 2 is a section on the line 2, 2 in Fig. 1; Fig. 3 is an enlarged detail section of the coal distributing devices, and Fig. 4 is an enlarged detail section of the coal and air mixing devices.

Similar numerals of reference indicate corresponding parts in the several views.

The numeral 1 indicates a hopper which may be of any ordinary hollow form supported by a suitable framework or the like 2, the lower delivery portion 1ª of which hopper is shown in cone-like form. At 3 is a filter bag supported upon and communicating with hopper 1 to permit the escape of air from the hopper and to prevent the escape of powdered coal through the bag. A pipe 4 communicates with the upper portion of the hopper. The delivery portion of pipe 4 within the hopper is preferably tangentially disposed. Powdered coal or coal dust is fed to the hopper through pipe 4 from any suitable grinding or pulverizing machine, and is carried therefrom into the hopper by a current of air circulating through the said machine in any well known manner, as by an air blower. The coal passes through the bottom of the hopper and the air entering the hopper with the coal flows out through the filter bag. The coal from the hopper feeds by gravity upon a rotating feeding table 5, located within a feeder box or chute 7 below the hopper. The outlet neck 1ᵇ of the hopper is shown provided with a nipple or extension 8 having threads 8ª, which extension supports an adjustable feeding sleeve 10, having internal threads engaging threads 8ª. The sleeve 10 is adjustable by means of said threads through a hole 11 in the top or cover of feeder box 7 over table 5. By rotating sleeve 10 it may be adjusted up or down with the respect to table 5 to regulate or control the flow of coal to the table. Table 5 is shown supported upon a shaft 12 journaled in bearings 13, 14, carried by the feeder box, which shaft is shown provided with gear 15 in mesh with a gear 16 on a driving shaft 17 shown journaled on support 14. Shaft 17 may be driven by any suitable power apparatus either at a constant speed, where no great variation of feed of coal is required, or if very great variation of feed of coal is required said table may be driven by any suitable variable speed device. At 18 is a cut-off knife resting upon table 5 to dislodge coal therefrom as the table rotates. The knife 18 is shown adjustably supported for movement over the top of the table, preferably in a radial direction, by means of threaded rod 19 that passes through a hole in the wall of feeder box 7 and is engaged by nut 20. The nut 20 may rotate but is kept from movement along the rod 19 by means of a suitable member 21, which may be forked and provided with a pin 22 entering a groove 20ª in nut 20. The knife 18 is adjustable in a slot in the adjacent wall of the feeder box. By turning the nut 20 in one direction or another knife 18 may be adjusted and retained in set position over table 5 as required. Feeder box 7 is shown provided with an inclined bottom 7ª and an outlet communicating with a smooth outlet pipe 23 shown entering the pipe 24 with a sliding fit, so that the parts 23, 24, may be adjusted telescopically. Pipe 24 is retained in position by suitable supports 25, 26. Pipe 24 is shown connected by screw threads with a delivery nozzle 27 that opens into a mixing chamber 28 provided with delivery nipple or tube 29. The outlet 27ª of nozzle 27 is shown reduced and the adjacent outer portion 27ᵇ of nozzle 27 is shown in spherical form received in a nut 30 having a spherical seat for surface 27ᵇ, said nut being connected with chamber 28 by screw threads at 31. A retaining nut 32 is also shown provided with threads in mesh with the adjacent threads 31 and co-operative with the surface 27ᵇ of nozzle 27. The arrangement is such that chamber 28 may be tilted respecting nozzle 27 within a suitable angle to meet conditions that are likely to be encountered in ignition in a sintering machine. Mixing chamber 28 is shown provided with an air inlet nozzle 33 connected by suitable couplings 34 with a hose or pipe 35, a regulating valve 36 being included in the couplings. Air under pressure from pipe or hose 35 may be blown into chamber 28, the volume of air being regulated by valve 36. Pipe or hose 35 may be connected to any compressed air apparatus, and the air may be used at about 15 pounds pressure for a sintering machine burner, or at any other desired pressure.

The nozzle 33 may be of any desired construction, although a well known form of spray nozzle may be used having a worm on the inside so that the air blown from the nozzle will have a whirling motion.

Chamber 28, adjacent to nozzle 33, may be provided with one or more air holes 37 controlled by a plate 38 having one or more holes 39. The plate 38 is rotative upon nozzle 33 and may be set to control the flow of air through holes 37 to the mixing chamber to regulate the entrance into said chamber of auxiliary air for combustion in case it is needed. For a sintering machine burner it may not be necessary to admit auxiliary air to chamber 28 if the air blown from nozzle 33 is not higher than 15 pounds pressure, but if such air is under higher pressure than 15 pounds it may be advisable to admit more air to the combustion chamber through holes 37.

Outlet 29 may be connected with any suitable combustion chamber, such as the combustion chamber of a sintering machine. When the apparatus is to be operated the powdered or pulverized coal will be blown into hopper 1 and will descend upon table 5, the latter being rotated at desired speed, and cut-off knife 18 will be set in position over the table to control the amount of coal to flow from the table into feeder box 7. By adjusting the sleeve 10 up or down with respect to table 5, as well as by adjusting knife 18 over the top of said table, the amount of coal scraped off the table by knife 18 may be regulated as required. If more coal is desired sleeve 10 may be raised or knife 18 may be adjusted inwardly, or both such adjustments may be made, and if less coal is required sleeve 10 may be adjusted toward the table, or knife 18 may be adjusted outwardly, or both such adjustments may be made. The speed of delivery of coal from the table, also, will be determined partially by the speed of rotation of the table. The coal delivered from table 5 passes from feeder box 7 through the outlet pipes and nozzle 27 into mixing chamber 28, where such coal is caught by the air flowing from nozzle 33, whereby such coal and air are mixed in said chamber and are discharged through outlet 29 into the combustion chamber in condition to be burned in the nature of a gas flame. The combustion chamber referred to may be in the form of an iron framework lined with firebrick or any other suitable construction. When the combustion chamber is cold some oily waste may be thrown into said chamber and burned to cause ignition of the powdered coal for a short time until the chamber itself has become heated, after which the ignition of the powdered coal will be self-sustaining. By means of the adjustment described of mixing chamber 28 with respect to nozzle 27, as well as the telescopic adjustment between pipes 23 and 24, the mixing chamber may be raised or lowered and tilted up or down so that the powdered coal and air mixture can be so directed against the combustion chamber wall as to obtain the flame regulation desired.

Having now described my invention, what I claim is:

1. An apparatus for feeding powdered coal comprising a hopper having an inlet and an outlet, a feeder box communicating with the outlet, a rotative table within the feeder box to receive coal from the hopper, a knife disposed over the table, means to adjust the knife respecting the table and retain the knife in set position, a mixing chamber communicating with the feeder box, and means to direct air into said chamber in the path of coal entering the same.

2. An apparatus for feeding powdered coal comprising a hopper having an inlet and an outlet, a feeder box, a sleeve adjustably supported between said outlet and feeder box and communicating therewith, a rotative table within the feeder box below said sleeve, means to rotate the table, a mixing chamber, a nozzle providing communication between the feeder box and the mixing chamber to deliver coal to the latter, and a nozzle communicating with the mixing chamber to deliver air therein to mix with the coal in said chamber.

3. An apparatus for feeding powdered coal comprising a hopper having an inlet and an outlet, a feeder box communicating with the outlet, a rotative table within the feeder box to receive coal from the hopper, a knife disposed over the table, means adjustably supporting said knife to retain the same in set position, a mixing chamber, a nozzle providing communication between the feeder box and the mixing chamber to deliver coal to the latter, and a nozzle communicating with the mixing chamber to deliver air therein to mix with the coal in said chamber.

4. An apparatus for feeding powdered coal comprising a hopper having an inlet and an outlet provided with a threaded extension, a threaded sleeve operable upon said extension, a feeder box having an opening receiving said sleeve, a table rotative within the feeder box below said sleeve, a mixing chamber having a nozzle communicating with the feeder box, and a nozzle for air communicating with said chamber to direct air to coal delivered from said first named nozzle.

5. An apparatus for feeding powdered coal comprising a hopper having an inlet and an outlet, a feeder box communicating with said hopper, a table rotative within the feeder box, a mixing chamber having a nozzle communicating with the feeder box, said nozzle having a spherical surface, a nut on the mixing chamber having a spherical seat for the spherical surface of the nozzle, and a nozzle for air communicating with the mixing chamber.

6. An apparatus for feeding powdered coal comprising a hopper having an inlet and an outlet, a feeder box communicating with said hopper, a table rotative within the feeder box, a mixing chamber having a nozzle communicating with the feeder box, said nozzle having a spherical surface, a nut on the mixing chamber having a spherical seat for the spherical surface of the nozzle, a nozzle for air communicating with the mixing chamber, said chamber having a hole adjacent to the air nozzle, and a perforated plate rotative to control the first named hole.

7. An apparatus for burning powdered coal comprising a hopper having an inlet and an outlet, a feeder box communicating with said outlet, a table rotative in said feeder box, telescopic tubes connected with the outlet of the feeder box, a nozzle connected with one of said tubes, a mixing chamber communicating with said nozzle, and a nozzle for air communicating with said mixing chamber.

Signed at New York city, in the county of New York, and State of New York, this 23rd day of November, A. D. 1920.

HENRY J. STEHLI.